(12) United States Patent
Morse et al.

(10) Patent No.: US 11,674,354 B2
(45) Date of Patent: Jun. 13, 2023

(54) PIERCING TOOL AIMING DEVICE

(71) Applicant: The Charles Machine Works, Inc., Perry, OK (US)

(72) Inventors: Larry G. Morse, Fairfield, TX (US); Mark D. Randa, Oconomowoc, WI (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

(21) Appl. No.: 17/517,901

(22) Filed: Nov. 3, 2021

(65) Prior Publication Data

US 2022/0136335 A1 May 5, 2022

Related U.S. Application Data

(60) Provisional application No. 63/108,966, filed on Nov. 3, 2020.

(51) Int. Cl.
    *E21B 7/26* (2006.01)
    *E21B 7/04* (2006.01)
    *G01B 7/31* (2006.01)

(52) U.S. Cl.
    CPC ............ *E21B 7/267* (2020.05); *E21B 7/046* (2013.01); *G01B 7/31* (2013.01)

(58) Field of Classification Search
    CPC .................. E21B 7/267; G01B 7/31
    See application file for complete search history.

(56) References Cited

U.S. PATENT DOCUMENTS

| | | | | |
|---|---|---|---|---|
| 3,529,682 | A * | 9/1970 | Coyne | E21B 7/046 405/184 |
| 4,646,277 | A * | 2/1987 | Bridges | E21B 7/068 173/4 |
| 6,504,367 | B1 * | 1/2003 | Chandrakumar | G01R 33/60 324/318 |
| 10,215,604 | B2 * | 2/2019 | Sugiyama | G01F 1/8472 |
| 11,204,437 | B2 | 12/2021 | Cole et al. | |
| 11,274,545 | B2 | 3/2022 | Klein | |
| 2004/0249573 | A1 | 12/2004 | McElhinney | |
| 2009/0085568 | A1 | 4/2009 | Cole | |
| 2014/0131103 | A1 | 5/2014 | Brune et al. | |
| 2016/0326839 | A1 * | 11/2016 | Ayub | E21B 36/04 |

(Continued)

FOREIGN PATENT DOCUMENTS

| | | |
|---|---|---|
| EP | 0428180 B1 | 12/1995 |
| GB | 2488026 * | 8/2012 |

OTHER PUBLICATIONS

TT Technologies, "Grundomat Pneumatic Piercing Tool", catalog, 2020, 4 pages, Aurora, IL.

(Continued)

*Primary Examiner* — Jonathan Malikasim
(74) *Attorney, Agent, or Firm* — Tomlinson McKinstry, P.C.

(57) ABSTRACT

A system and for providing a bore sight in a piercing tool. A transmitter emits a magnetic field. The flux lines which emanate along the transmitter axis are substantially straight. A receiver at a remote, target location can detect these flux lines. The receiver and transmitter are oriented such that the substantially straight flux line are along an intended bore path. Then, a piercing tool or other boring tool is oriented along the same path and a bore is created.

16 Claims, 5 Drawing Sheets

(56) References Cited

U.S. PATENT DOCUMENTS

2018/0209261 A1* 7/2018 Lubrecht ................ E21B 10/64
2019/0226316 A1  7/2019 Burrows et al.

OTHER PUBLICATIONS

International Searching Authority, "PCT International Search Report", dated Feb. 18, 2022, 5 pages, Republic of Korea.
International Searching Authority, "PCT Written Opinion of the International Searching Authority", dated Feb. 18, 2022, 5 pages, Republic of Korea.

* cited by examiner

PIERCING TOOL AIMING DEVICE

SUMMARY

The present invention is directed to a method for planning and maintaining a straight line path to an intended target when using a piercing tool or similar device.

BRIEF DESCRIPTION OF THE DRAWINGS

FIG. 5 is an alternative job site with the transmitter disposed in the second location and the receiver at a first location with a planned bore path extending therebetween. In FIG. 5, the piercing tool and receiver are located on the same side of the planned borepath.

DETAILED DESCRIPTION

The use of high frequency alternating current ("AC") fields for short range direction finding is useful in locating subterranean devices and tools such as HDD bits. These devices are known in the art, such as in U.S. Pat. No. 7,786,731, issued to Cole, et al., the contents of which are incorporated by reference herein.

These "AC" fields can be detected using a wire wound coil and a narrow band filter receiver tuned to the transmit frequency. A coil of wire can only detect a changing magnetic field and therefore cannot detect a "DC" field.

Figure 1:
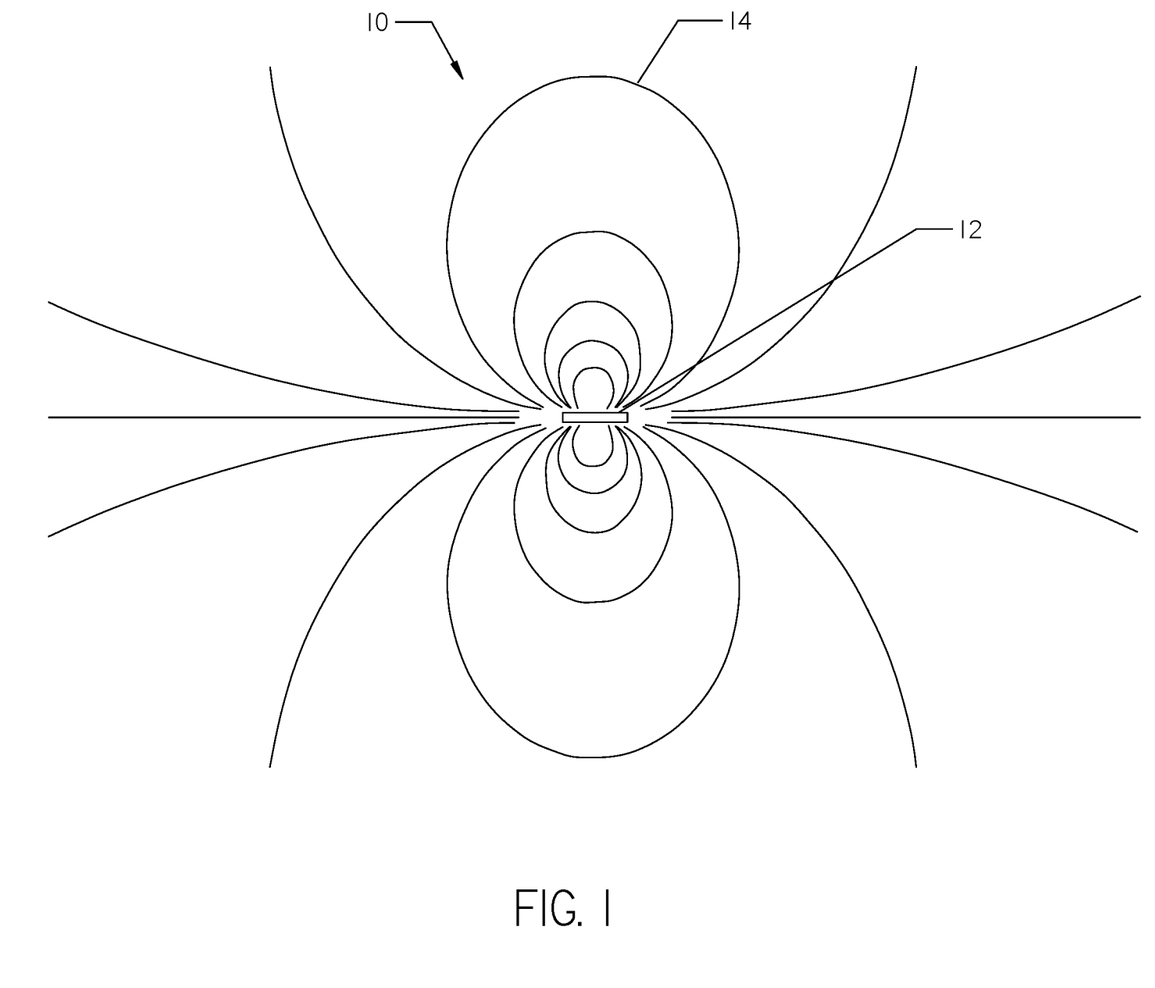
FIG. 1 is a schematic of a magnetic field emanating from a transmitting antenna, with flux lines represented visibly. The axis of the transmitter is parallel to the page in the image of FIG. 1.

With reference to FIG. 1, such an "AC" magnetic field 10 emanating from a dipole field transmitter 12 is shown. The limitations of such a field 10 are dictated by the fact that magnetic lines of flux 14 emanating from the transmitter 12 are curved, flowing around a loop from one pole of the transmitter 12 to the other. The only flux lines 14 which approximate to "straight" lines are those which extend from the ends of the transmitter. These will average to a straight line when integrated by the area of a coil receiving antenna 16, when that receiver is on such a "straight" line. This technique will be referred to throughout the application as "bore sighting", with a line of straight magnetic flux 14 considered a bore sight line 15.

It should be understood that while only two dimensions of the field 10 are shown in FIG. 1, it represents a three dimensional field which extends into, and out of, the figure. However, if the figure represents the x-y aspect of the field 10 in a Cartesian coordinate system with the transmitter axis (and bore sight line 15) parallel to the x axis, the x-z aspect of the field will be substantially identical. To the extent that only two dimensions of a field may be shown in any figure, it can be understood that the figure is parallel to the transmitter axis.

Figure 2:
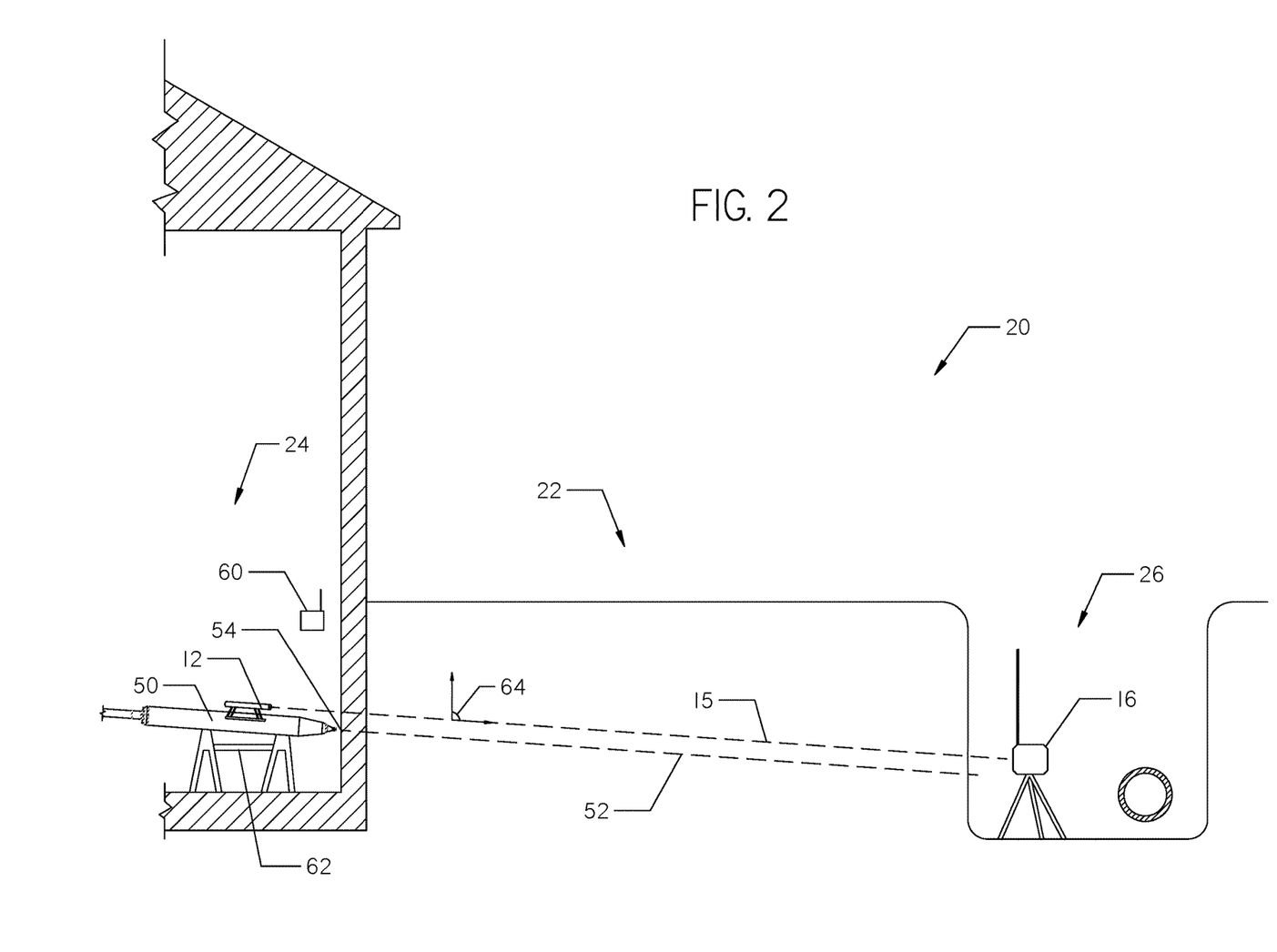
FIG. 2 is a side cut-away view of a job site wherein a transmitter and piercing tool are located at a first location while a receiver is located at a second location with a planned bore path extending therebetween.

With reference to FIG. 2, a simple job site 20 is shown. On the job site 20, a desired bore path 22 exists between a first location 24 and a second location 26. As shown, the first location 24 and second location 26 are visually separated, such that an operator at one of the first 24 and second 26 location cannot see the other location. For example, each of the first location 24 and second location 26 may be in a basement or pit.

The desired bore path 22 may be known roughly, but minimizing errors over a bore length is important. For example, for a twenty-foot bore, an error of three degrees at the starting location results in an error of over a foot.

The magnetic flux lines 14 generated by a transmitter 12 penetrate the ground and can be "visible" at an otherwise invisible location. If the receiving antenna 16 is oriented towards the transmitter 12, the direction of the lines of flux 14 can be measured and used to determine the orientation of the transmitter 12.

The transmitter 12 may be a standard ferrite antenna. In some embodiments, the ferrite antenna or other transmitter may be supported such that it is isolated from shock.

Figure 4:
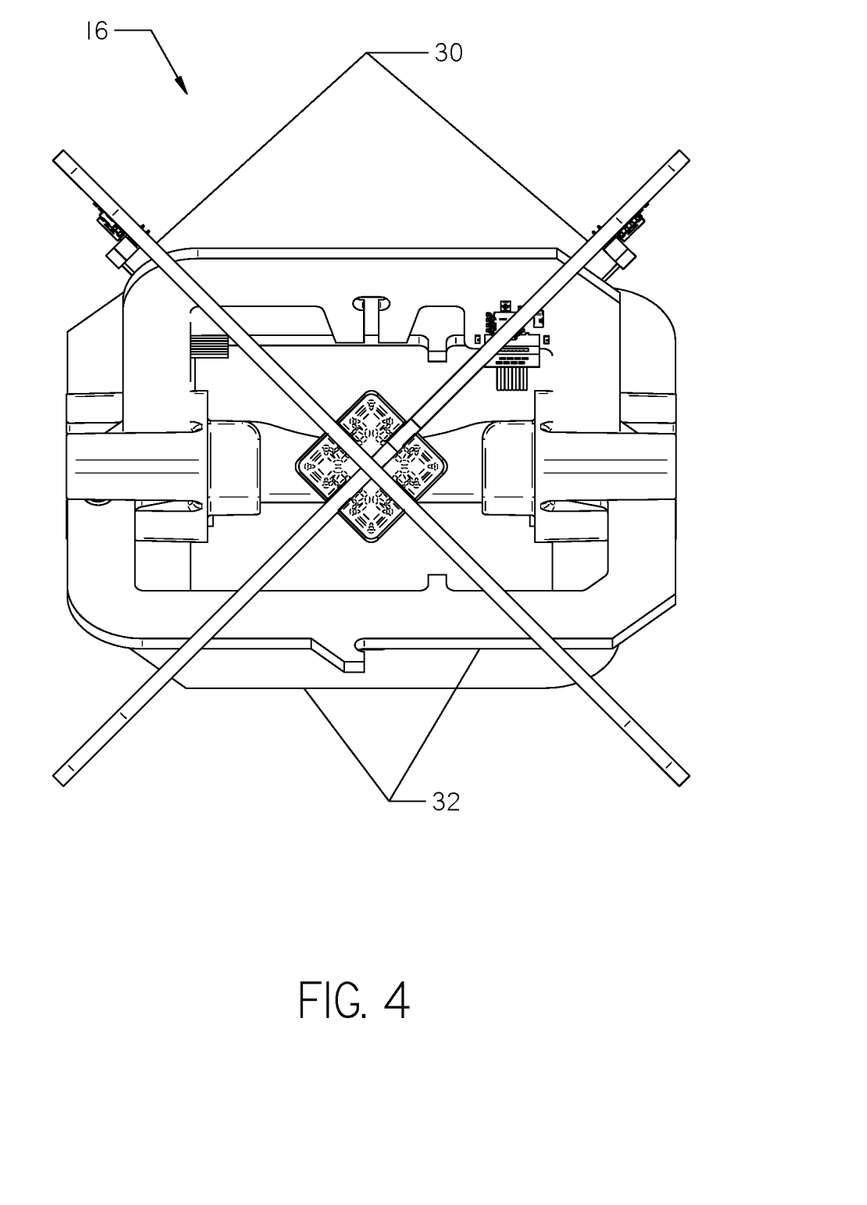
FIG. 4 is an image of a receiving antenna capable of receiving the magnetic field and determining whether the receiving antenna is aligned with the "bore sight" as described herein. The receiving antenna has two pairs of orthogonal antenna coils.

It may be preferable to utilize an orthogonal array of receiver coils used to measure flux direction. One such set of coils is shown in U.S. Pat. Pub. No. 2020/0142089, Cole, et al., the contents of which are incorporated by reference herein. FIG. 4 shows such a receiving antenna 16. The antenna 16 comprises a first 30 and second 32 pair of antennas, each pair 30, 32 oriented with common centers and at ninety degree angles relative to the other of the pair. In this way, the field 10 can be balanced across each pair 30, 32 to align the receiving antenna 16 with the bore sight line 15 of the field 10.

By orienting the transmitter 12 and receiver 16 prior to boring operations, the receiver 16 can detect deviation of the transmitter by detecting a "curve" in the received flux lines 14. This can be accomplished by orienting both the receiver 16 and transmitter 12 to the same reference direction, then rotating the transmitter 12 until the rotation angle of the transmitter is equal to the measured angle of the magnetic flux lines 14 in the receiver 16. This angle is then locked into the receiver 16 software and used to monitor the transmitter 12 motion. This operation may take place in either two dimensions or three, by using a compass direction for azimuth and an elevation sensor.

In this way, the transmitter 12 and receiver 16 can define the bore sight line 15 between them, for use in boring techniques, as described below. Sighting a bore is especially advantageous when used with a piercing tool 50, such as tools like that found in U.S. Pat. No. 7,028,785, issued to Randa, et al., the contents of which are incorporated herein by reference. Piercing tools 50 typically include reciprocating strikers (not shown) which cause a front nose to move through a subsurface.

In the job site 20 of FIG. 2, the piercing tool 50 is at the first location 24—a basement—with no visual sight line to the second location 26 in a pit. In operation, the piercing tool 50 will initially form a borehole 52 at an entry point 54, and once fully in a subterranean formation, will maintain a substantially straight line. However, small mistakes in the angle at which the piercing tool 50 is started can result in a misaligned borehole. Thus, a misaligned piercing tool 50 at the first location 24 may miss the second location 26 by an unacceptable amount. Using flux lines of an emitted field to orient a piercing tool to a target may overcome these limitations.

While other tools may be used with the transmitter 12 and determination of a bore sight line 15, such tools will need to operate on substantially straight lines such that the straight bore sight line 15 is useful.

Figure 3:
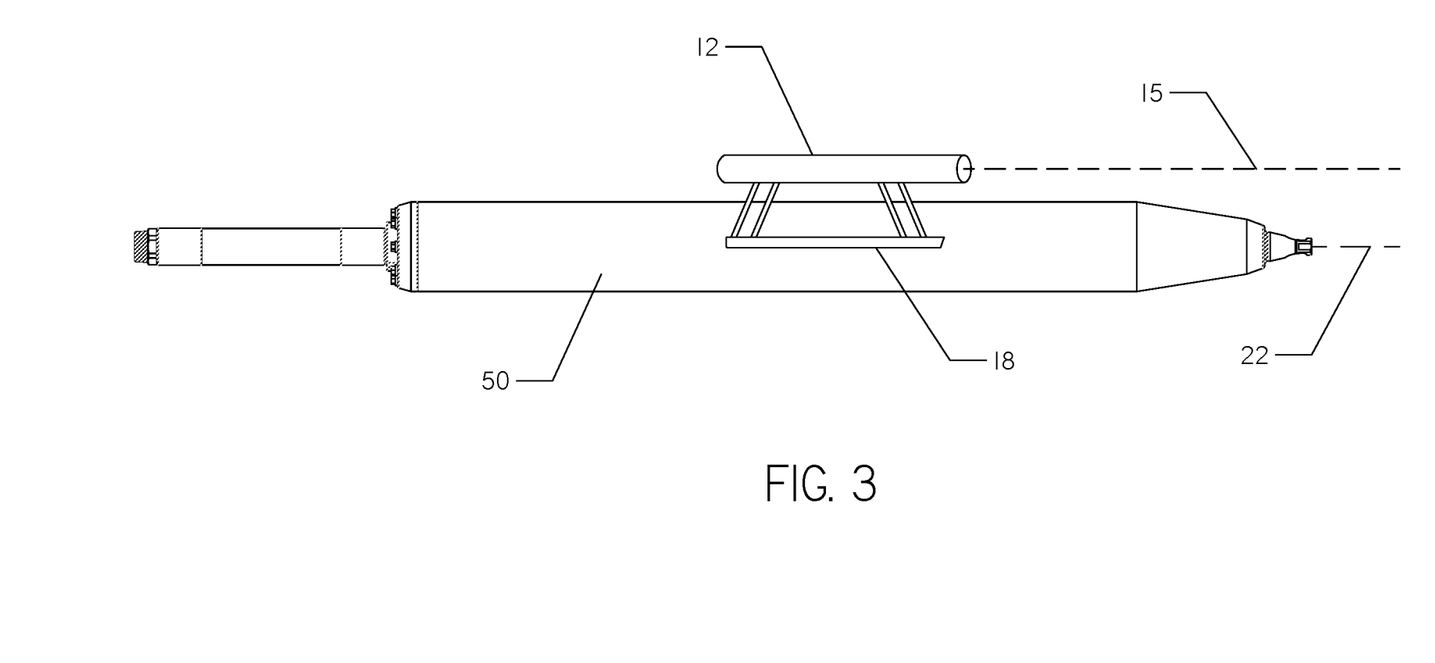
FIG. 3 is an image of a transmitter placed on an attachment to a piercing tool for generating a magnetic field in line with the axis of the tool.

The operator initially orients the transmitter 12 to point to the receiver 16. As shown in FIG. 3, the transmitter 12 is mounted to a bracket 52 which is temporarily attached to the piercing tool 50. The bracket 52 may be magnetically attached to the piercing tool 50 such that the transmitter 12 axis is parallel to the axis of the piercing tool.

As shown, the bore sight line 15 is offset some distance from the desired bore path 22. The receiver 22 may be positioned at a similar offset from the target at the second location 26. Further, the bracket 52 may be at a small enough offset such that the error between the transmitter 12 position and the centerline of the piercing tool 50 is negligible.

Other apparatus could be used, for example, the transmitter 12 could be disposed internally in a housing located behind, and in line with, the piercing tool 50. A ring-shaped harness may be used for attaching the transmitter. In any case, the transmitter 12 should be oriented such that its longitudinal axis is parallel to the longitudinal axis of the piercing tool 12.

The field 10, and flux lines 14, generated by the transmitter 12 are received at the receiver 16. The bore sight line 15 is found and the receiver 16 oriented accordingly, with the proper angle and orientation locked into the receiver 16. This orientation will define the desired bore path 22, which extends along the bore sight line 15 between the first 24 and second 26 location. The receiver 16, locked into position and orientation, can subsequently monitor the transmitter coil 12 orientation as the piercing tool 50 is inserted into the subsurface.

As shown in FIG. 2, the proper orientation is achieved, with the transmitter and receiver oriented along the bore sight line 15, which is substantially identical to the desired borepath 22. The path shown is substantially horizontal, but it should be understood that the planned borepath may have a vertical component, and a component "into the page"—that is, the bore sight line 15 is determined in three dimensions. Likewise, angle 64 is shown from vertical from illustrative purposes, but the angle at which the sight line 15 (and thus the borepath 52) is oriented may have components in three dimensions.

A compass may be used to orient the receiver 16 to a cardinal compass direction. Orientation data may be fed back to an operator via a wire or an RF transmitter from the receiver 16. The transmitter 12 may be mounted on a protractor or goniometer which is oriented to the same cardinal direction. The operator may then rotate the transmitter 12 until the measured angle 64 on the protractor is equal to the flux direction measured by the receiver 16. The receiver 16 is then nulled relative to this direction to find the bore sight line 15.

Since the tool may be in a basement, normal Bluetooth signals to communicate between the receiver 16 and transmitter 12 may not be sufficient. One transmission method would be to transmit Multi-Use Radio Service ("MURS") packet signals. The lower frequency and higher power allow for longer ranges and greater penetration than Bluetooth.

An application or program in a common smart phone device or other hand-held device may be used for the processing and alignment. As these devices usually do not receive multi-use radio service signals, a relay device 6o may be necessary if such a signal is utilized. This relay device 6o would be located near the operator and would translate the radio data to Bluetooth for use by the hand-held device. This relay 60 could also have LEDs which would indicate bore sight errors as the piercing tool 50 is used.

The transmitter 12 may initially be paired with a protractor or goniometer or other sort of orientation sensor, such that it may be matched to the angle of the receiver 16. The transmitter 12 and receiver 16 are oriented along the proper angle 64 on opposing sides of the bore sight path 15, which is substantially the desired bore path 22.

If the operation of the piercing tool 50 makes continued pairing with the transmitter 12 unfeasible, it may be mounted in an offset, parallel position to keep the tool aligned as it is inserted into the ground. Alternatively, the transmitter 12 may continue to be paired with the piercing tool 50 until the alignment of the piercing tool is assured, such as after a length of the borehole is created. An alignment cradle 62 may be used with the piercing tool 50 to orient the tool to the proper angle. Such an alignment cradle 62 may be helpful in matching the measured angle of the piercing tool 50 to the angle of the protractor.

Prior to use at a job site 20, the transmitter 12 and receiver 16 may be calibrated to reduce measurement errors. Calibration may occur by many techniques. One such technique to first orient the transmitter 12 and receiver 16 to the same direction. For example, both may be oriented toward magnetic north. The transmitter 12 is then angled such that the flux angle measured by the receiver 16 equals the angle of the transmitter as measured by a goniometer or protractor. This condition indicates the transmitter 12 is pointing to the center of the receiver 16 antenna array. The receiver 16 is then "zeroed" to this angle and subsequently measures the deviation of transmitter 16 heading from this "boresite" line. Preferably, this calibration technique would be performed for both azimuth and elevation.

Figure 5:
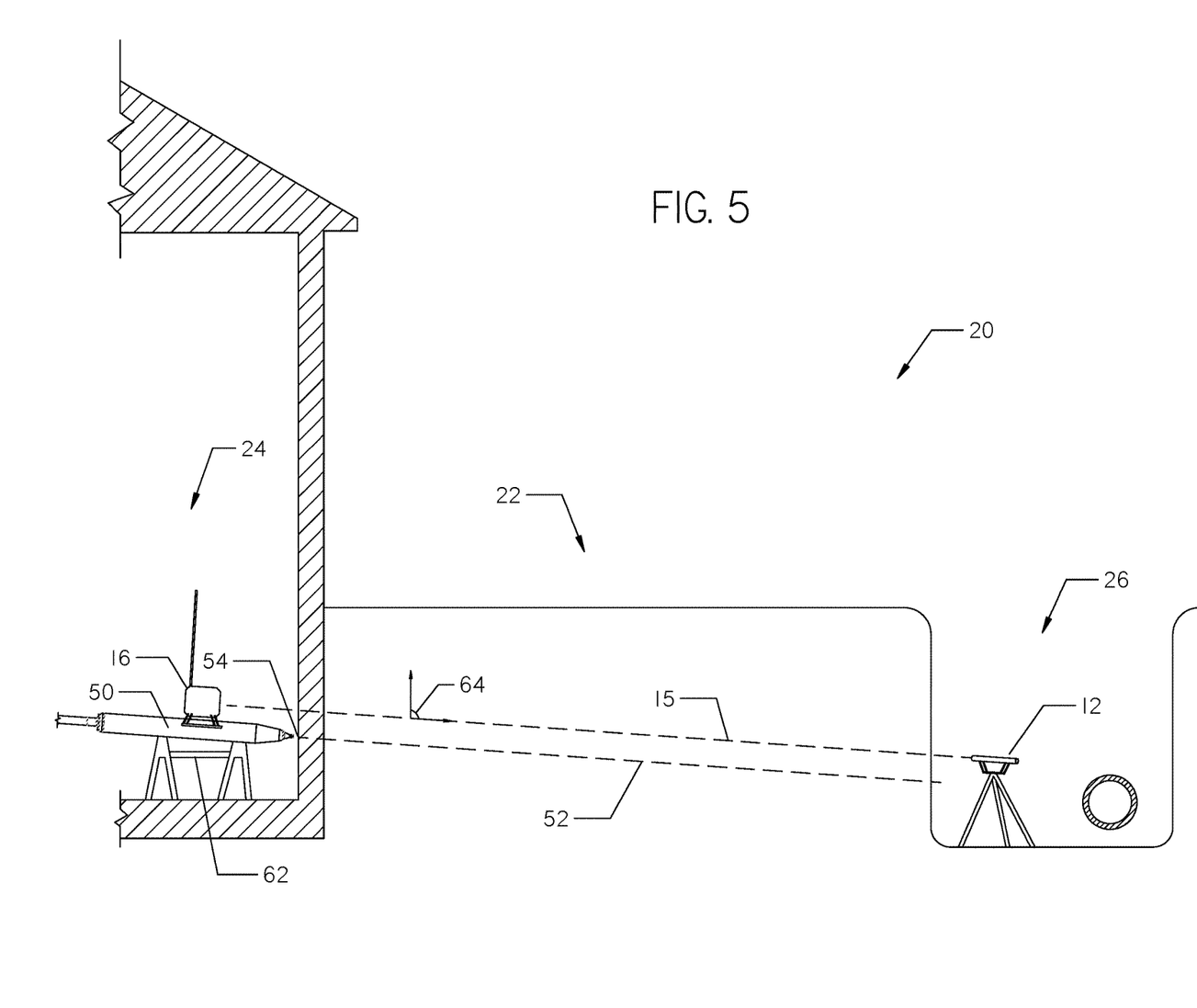

Changes may be made in the construction, operation and arrangement of the various parts, elements, steps and procedures described herein without departing from the spirit and scope of the invention as described in the following claims. For example, as shown in FIG. 5, the positions of the transmitter 12 and receiver 16 at a job site 20*a*, are alternated. The steps for operating the system are similar in this orientation, with the bore sight line 15 determined in the same manner. However, with the transmitter located on the opposite side of the planned bore path from the transmitter, it is the angle at the receiver 16 which must be matched by the insertion of the piercing tool 50.

The invention claimed is:

1. A method, comprising:
    generating a magnetic field comprising flux lines at a transmitter disposed at a first location;
    mounting the transmitter to a boring tool;
    receiving the magnetic field at a second location spaced apart from the first location;
    orienting the magnetic field such that the flux lines are substantially straight at the second location;
    at a selected one of the first location and second location, determining a straight line path to the unselected one of the first location and second location using the flux lines;
    removing the transmitter from the boring tool; and
    thereafter, boring a hole along the straight line path.

2. The method of claim 1 in which:
    the step of orienting the magnetic field comprises:
        positioning a transmitter of the magnetic field;
        determining a flux angle at the second location;
        transmitting the flux angle at the second location to the first location; and
        repositioning the transmitter of the magnetic field.

3. The method of claim 2 in which the step of boring the hole begins at the first location.

4. The method of claim 2 further comprising:
providing a protractor at the first location;
setting the protractor to the flux angle; and
repositioning the transmitter of the magnetic field using the protractor.

5. A method comprising:
at a first location, providing a piercing tool;
at a second location, spaced apart from the first location, providing a receiver;
placing the piercing tool in an alignment cradle;
pairing a transmitter of a magnetic field to the piercing tool;
emitting the magnetic field from the transmitter;
aligning the transmitter and receiver such that flux lines of the magnetic field received at the receiver are oriented in a substantially straight line; and
aligning the alignment cradle such that the piercing tool is oriented parallel to the substantially straight line; and
thereafter, boring a path from the first location to the second location using the piercing tool; and
removing the transmitter from the piercing tool prior to the piercing tool arriving at the second location.

6. The method of claim 5 further comprising:
boring a hole with the piercing tool parallel to the substantially straight line.

7. The method of claim 6 further comprising:
while boring the hole with the piercing tool:
measuring deviations from the substantially straight line; and
correcting a path of the piercing tool in response to a measured deviation from the substantially straight line.

8. The method of claim 5 wherein the step of aligning the transmitter and receiver comprises:
orienting the transmitter along an estimated bore path line;
receiving the emitted magnetic field at the receiver; and
orienting the receiver to detect a substantially straight flux line.

9. The method of claim 8, wherein the step of aligning the transmitter and receiver further comprises:
if the substantially straight flux line is detected, transmitting a measured angle of the substantially straight flux line from the second location to the first location.

10. The method of claim 8, wherein the step of aligning the transmitter and receiver further comprises:
if no substantially straight flux line is detected at the receiver, reorienting the transmitter and receiver until a substantially straight flux line is detected at the receiver;
thereafter, transmitting a measured angle of the substantially straight flux line from the second location to the first location.

11. The method of claim 5 in which the transmitter is mounted to the piercing tool with a magnetic bracket.

12. The method of claim 5 in which the transmitter is offset and external from the piercing tool at a parallel orientation.

13. The method of claim 5 further comprising:
transmitting a measured angle of the substantially straight line from the second location to the first location via a wireline.

14. The method of claim 5 further comprising:
transmitting a measured angle of the substantially straight line from the second location to the first location via a multi-use radio service packet signal.

15. A method comprising:
generating a magnetic field at a first location with a transmitter;
detecting the magnetic field at a second location with a receiver;
orienting the transmitter and a piercing tool such that the transmitter and the piercing tool are parallel;
orienting the transmitter and the receiver to generate a straight line path between the first location and the second location using a substantially straight flux line within the magnetic field; and
after the orientation steps are complete, with the piercing tool, opening a bore hole extending between the first location and the second location;
prior to completing the step of opening the borehole extending between the first location and the second location, removing the transmitter from its parallel orientation relative to the piercing tool.

16. The method of claim 15 in which the piercing tool begins opening the bore hole from the first location.

* * * * *

UNITED STATES PATENT AND TRADEMARK OFFICE
CERTIFICATE OF CORRECTION

| | | |
|---|---|---|
| PATENT NO. | : 11,674,354 B2 | Page 1 of 1 |
| APPLICATION NO. | : 17/517901 | |
| DATED | : June 13, 2023 | |
| INVENTOR(S) | : Morse et al. | |

It is certified that error appears in the above-identified patent and that said Letters Patent is hereby corrected as shown below:

In the Specification

Column 3, Line 64, please delete "6o" and substitute therefor "60".
Column 3, Line 66, please delete "6o" and substitute therefor "60".

Signed and Sealed this
Twenty-fifth Day of July, 2023

Katherine Kelly Vidal
*Director of the United States Patent and Trademark Office*